May 2, 1961 M. J. GLENDAY ET AL 2,982,805
IGNITION SYSTEM FOR INTERNAL COMBUSTION ENGINES
Filed July 13, 1959 4 Sheets-Sheet 2

INVENTORS.
Martin J. Glenday,
BY David E. O'Connor.
Balluff and McKinley
ATTORNEYS.

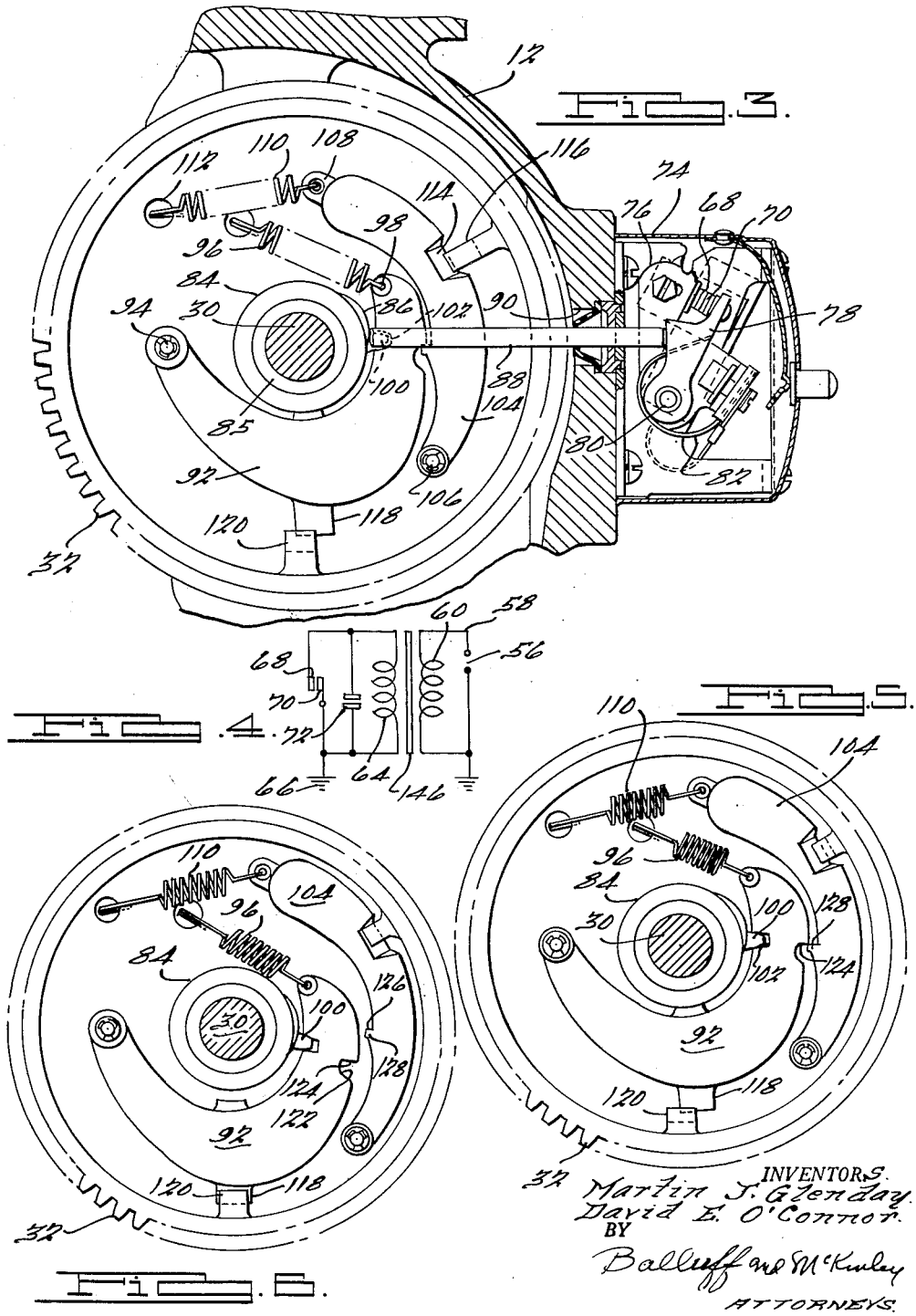

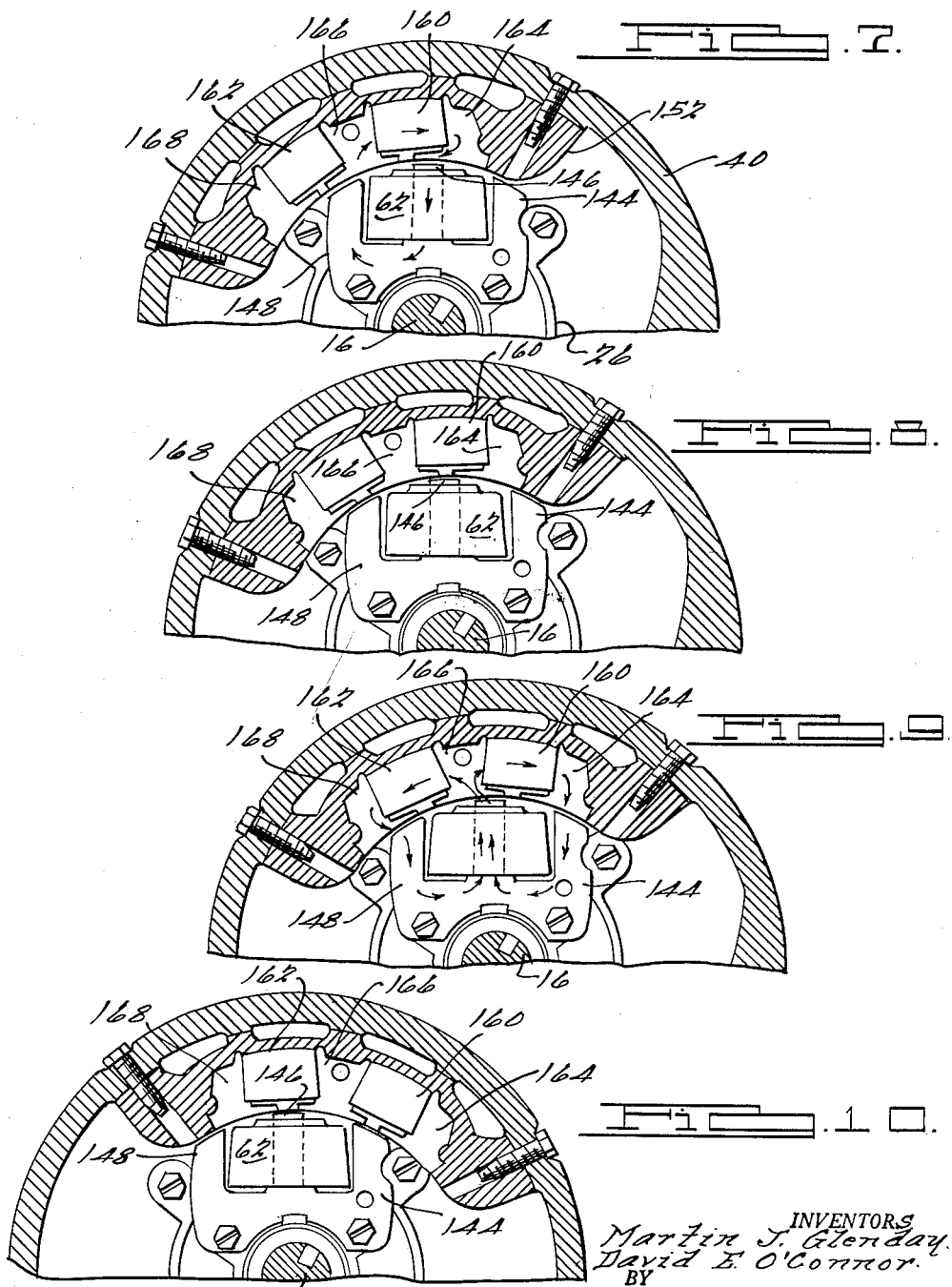

United States Patent Office 2,982,805
Patented May 2, 1961

2,982,805

IGNITION SYSTEM FOR INTERNAL COMBUSTION ENGINES

Martin J. Glenday, Clinton, Mich., and David E. O'Connor, Houston, Tex., assignors to Clinton Engines Corporation, Clinton, Mich., a corporation of Michigan Filed July 13, 1959, Ser. No. 826,515

8 Claims. (Cl. 123—149)

This invention relates to ignition systems and has particular reference to a flywheel type magneto ignition system for an internal combustion engine.

Internal combustion engines are frequently provided with automatic spark advance mechanisms to advance the time of firing of the spark plug during normal engine operation to a time considerably in advance of the time of firing of the plug at low engine speeds and during starting of the engine. Such spark advance devices normally employ an engine driven cam for opening the breaker points at a desired instant in the engine cycle and a centrifugally actuated mechanism operable in response to an increase in engine speed to advance the cam, and time of opening of the breaker points, as the engine speeds up. In prior systems the speed at which the timing shift begins cannot be controlled with any degree of accuracy because of the variable friction factors present in the system. A speed at which the cam reaches its fully advanced position cannot be controlled for the same reason. This allows the timing change to span a wide speed range and usually some part of the timing change occurs within the normal operating range of the engine, with the result that the engine is unable to deliver optimum power during such portion of its operating range.

The present invention provides an improved type of spark advance mechanism which insures that the breaker cam will not be advanced until the engine has attained a predetermined minimum speed, and that at such speed the cam will be abruptly shifted to its advanced position, thus limiting the duration of the timing change to a minimum. With the present system the timing change can be made to occur within about one revolution of the engine and the engine speed at which the timing shift occurs can be controlled to within about 25 revolutions per minute. The timing shift can be made to occur below the normal operating range of the engine so that maximum engine power can be developed throughout the full operating range of the engine.

In addition, the present invention contemplates an improved magneto which is designed to obtain two separate but equal amplitude flux reversals through the coil during each engine cycle so that one of the flux reversals may be employed for firing the spark during starting and low speed engine operation, while the other is available to produce the spark at higher or normal engine speeds after the timing shift has occurred. There is thus established a controlled relationship between the time of opening of the breaker points in accordance with engine speed and the establishment of optimum flux conditions in the coil core to produce the spark. It is therefore possible with the present invention to obtain the highest possible voltage in the secondary coil at the time the breaker points are opened, regardless of whether the engine is operating with a retarded or advanced spark.

A principal object of the invention is to provide an improved magneto for internal combustion engines.

Another object of the invention is to provide a magneto which is capable of producing two separate but equal amplitude flux reversals through the coil core during each engine cycle.

Another object of the invention is to provide a magneto which is adapted to provide sufficiently high voltage in the secondary coil at two separate instances during each cycle of the engine, thereby to produce sufficiently high voltage for firing the spark plug at a retarded spark position and a second such voltage for firing the plug in an advanced spark position.

Another object of the invention is to provide a centrifugally actuated breaker point mechanism which is designed to maintain the opening of the breaker points in a retarded spark position until a predetermined engine speed is reached and then to abruptly advance opening of the breaker points to an advance spark position suitable for normal running of the engine.

A further object of the invention is to provide an ignition system of the type described which is designed to generate sufficiently high voltage in the spark plug circuit to obtain the required spark for combustion, regardless of whether the engine is operating under retarded or advanced spark conditions.

Other and further objects of the invention will be apparent from the following description and claims and may be understood by reference to the accompanying drawings, of which there are four sheets, which by way of illustration show a preferred embodiment of the invention and what we now consider to be the best mode of applying the principles thereof. Other embodiments of the invention may be used without departing from the scope of the present invention as set forth in the appended claims.

In the drawings:

Fig. 3 is a fragmentary sectional view taken on line 3—3 of Fig. 1;

Fig. 4 is a wiring diagram illustrating the ignition circuit;

Fig. 5 is an elevational view of the spark advance mechanism showing the same in its retarded spark position;

Fig. 6 is a view similar to Fig. 5 but showing the timing mechanism in its advanced spark position;

Figs. 7 to 10 are fragmentary sectional views illustrating different operative positions of the stator and rotor parts of the magneto; and Fig. 11 is a chart showing the flux curve developed by the magneto.

Figure 1:
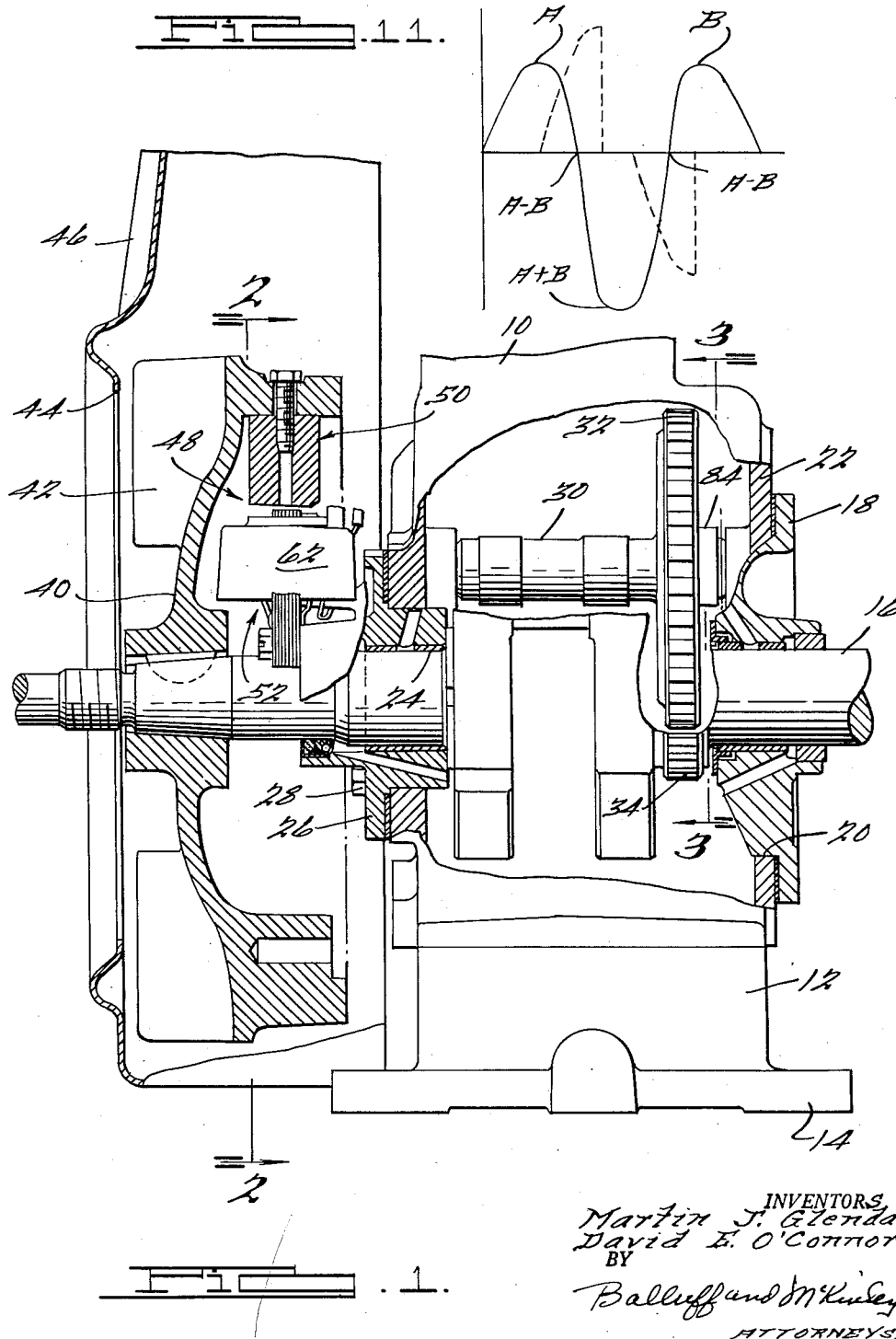
Fig. 1 is a fragmentary view partly in section of a single cylinder internal combustion engine having the magneto ignition system and spark advance mechanism of this invention.
Figure 2:
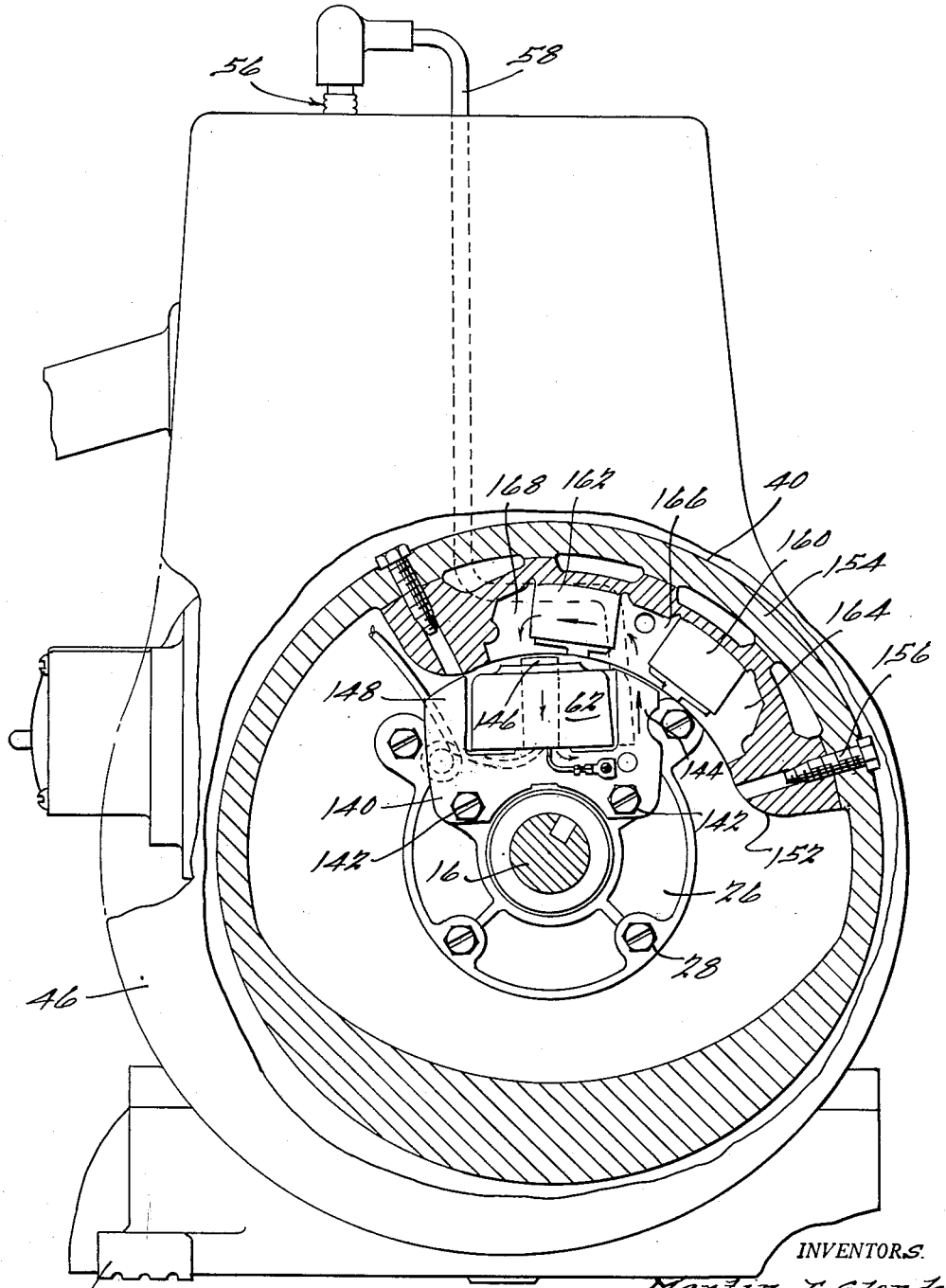
Fig. 2 is a view taken on line 2—2 of Fig. 1.

In Figs. 1 and 2 there is disclosed a portion of an internal combustion engine having a cylinder 10, a crankcase 12 having a supporting base 14, and a crankshaft 16 journaled at one end in a bearing plate 18 closing an opening 20 in one wall 22 of the crankcase 12. The other end of the crankshaft is journaled in a bearing 24 carried by a plate 26 secured to the opposite wall of the crankcase 12 by bolts 28. A camshaft 30 is provided with a gear 32 meshed with a smaller gear 34 on the crankshaft 16 so that the gear 32 is driven from the crankshaft at one-half the speed of the crankshaft.

A flywheel 40 is secured on one end of the crankshaft 16 outwardly of the crankcase 12 and includes integrally formed blades 42 operable to draw air through the inlet 44 provided in the shroud 46 which encloses the flywheel 40. The magneto indicated in general at 48 includes a rotor structure 50 carried by the flywheel 40 and a stator structure 52 which is mounted on the bearing plate 26.

The ignition system includes a conventional spark plug indicated at 56 which is connected by a line 58 to the secondary winding 60 of the ignition coil 62 which forms a part of the stator 52 of the magneto. The ignition circuit is shown in Fig. 4 and includes a primary coil 64 having one end grounded as at 66 and its other end connected to the fixed breaker point 68. The movable breaker point 70 is also grounded and condenser 72 is connected across the breaker points 68 and 70. An ignition circuit of this type is more or less conventional in the art.

The breaker points 68 and 70 are located within a housing 74 mounted on the exterior of the engine crankcase. The fixed breaker point 68 is mounted on a plate 76, while the movable breaker point 70 is secured on an arm 78 which is pivoted on a pin 80 to the plate 76. A leaf spring 82 urges the arm 78 to a position in which the breaker points 68 and 70 are engaged.

A breaker cam 84 is rotatably mounted on the hub 85 of the gear 32. The cam 4 is provided with a cam portion 86 engageable with the inner end of a slidable breaker point actuating plunger 88. The plunger 88 is slidable axially through an opening 90 in the wall of the crankcase leading to the breaker housing 74. The outer end of the plunger 88 is engageable with the arm 78 of the breaker mechanism to open the breaker points 68 and 70 as the inner end of the plunger rides up over the cam portion 86 of the cam 84 during each revolution of the gear 32, or once during each two revolutions of the crankshaft 16.

As shown in Figs. 3, 5 and 6, a shiftable weight 92 is pivoted at 94 to the gear 32. A spring 96 has one end secured to the gear 32 and its other end connected as at 98 to the free end of the weight 92 to resist movement of the weight under the influence of centrifugal force. The cam 84 is provided with a projection 100 engaging within a recess 102 in the weight 92 so that the cam 84 rotates with the gear 32. As the weight 92 swings outwardly about its pivot 94 under the influence of centrifugal force as the engine speeds up, the engagement between the projection 100 and recess 102 will act to advance the cam 84 relative to the gear 32, thereby producing actuation of the breaker points 68 and 70 at an earlier time in the engine cycle.

The centrifugal spark advance mechanism includes a control weight 104 pivoted at one end on a pin 106 to the cam gear 32 and connected at its free end 108 to one end of a spring 110 which has its other end connected at 112 to the gear 32. The control weight 104 is provided with a reduced intermediate portion 114 which is straddled by a slotted arm 116 on the gear 32 to maintain the weight 104 in a plane parallel to the gear 32 as the weight swings about its pivot 106 under the influence of centrifugal force and the spring 110. The weight 92 is similarly guided in its movement by the engagement of a lug 118 on the weight 92 with a slotted arm 120 on the gear 32.

The weight 92 is provided on its outer surface with a recess 122 having a substantially flat surface 124 adapted to engage a corresponding surface 126 formed on a lug 128 projecting from the opposing surface of the control weight 104. The weights 92 and 104 are shown in their innermost positions in Fig. 3, which illustrates the position of such parts when the engine is at rest or is being cranked. Springs 96 and 110 hold the weights 92 and 104 in engagement in their inner position at such time. As shown in Fig. 5, the control weight 104 begins to swing outwardly against the force of its spring 110 as the engine begins to speed up. The centrifugal force acting on the shift weight 92 is sufficient to swing the weight 92 to its advanced position after the engine has been started, but the projection 128 on the control weight 104 remains in engagement with the surface 124 on the shift weight 92, thereby preventing any movement of the shift weight 92 at such time. When the engine has attained a predetermined speed, for example, 800 r.p.m., the control weight 104 will swing outwardly far enough to disengage the projection 128 from the surface 124, thereby enabling the weight 92 to rapidly swing outwardly under the influence of centrifugal force to advance the cam 84 to the advanced spark position. With this arrangement the cam 84 will remain adjusted for a retarded spark up to a predetermined engine speed and when such speed is attained the cam will be abruptly shifted to its advanced spark position. This construction in conjunction with the magneto arrangement to be described insures that the spark plug will be fired at a time when the maximum voltage is available in the secondary coil rather than being fired at successively advanced positions as the engine gradually speeds up, as occurs in conventional spark advance mechanisms in which the shift weight gradually advances the cam in accordance with increased engine speed. It is contemplated that the weight of the arm 92 and the force of its spring would permit the weight 92 to move sufficiently in response to centrifugal force to advance the cam to its advanced spark position prior to release of the arm 92 by the control arm 104. However, the weight of the control arm 104 and the force of its spring resists centrifugal force sufficiently to prevent release of the shift weight 92 until the predetermined engine speed is reached. Thereafter the weight is operable to rapidly advance the cam as described.

The stator 52 of the magneto comprises a core 140 of magnetic material which is bolted onto the plate 26 by bolts 142. The core includes first, second and third poles 144, 146 and 148, respectively, having their outer faces concentric with and disposed equal distances from the axis of the crankshift 16. The central leg 146 of the core is disposed between and equally spaced from the legs 144 and 148. The coil 62 which includes the primary and secondary windings 64 and 60 is secured on the stator pole 146.

The rotor 50 of the magneto comprises a block 152 of nonmagnetic material secured to the rim 154 of the flywheel 40 by bolts 156. A pair of permanent magnets 160 and 162 are secured to the block 152 in angularly spaced relation. The magnets 160 and 162 are angularly charged and are arranged so that like poles of the two magnets are opposed to each other. For example, the leading magnet 160 may have its north pole at the leading end thereof, assuming a clockwise rotation of the flywheel as viewed in the drawings, and its trailing end of south polarity, while the leading end of the trailing magnet 162 is of south polarity and its trailing end of north polarity. The rotor further includes first, second and third pole shoes 164, 166 and 168. The pole shoe 164 is connected to the leading end of the leading magnet 160. The second shoe 166 is disposed between the two magnets and is magnetically connected to the trailing end of the leading magnet 160 and the leading end of the trailing magnet 162. The third pole shoe 168 is engaged with the trailing end of the magnet 162. The three pole shoes 164, 166 and 168 have concentric inner faces which are adapted to pass in close proximity to the outer faces of the stator poles 144, 146 and 148 upon rotation of the flywheel. The inner faces of the pole shoes are of substantially equal arcuate extent. An angular gap is provided between the shoes 164 and 166 and the shoes 166 and 168.

As the flywheel 40 reaches the position shown in Fig. 7 the leading or first pole shoe 164 overlies the second stator pole 146, while the pole shoe 166 overlies the third stator pole 148, thus inducing a current through the pole 146 and the coil in the direction indicated by the arrows in Fig. 7. The flux induced in the coil core in this position of the flywheel will be derived solely from the magnetomotive force of the magnet 160 and is represented by the point A on the flux curve illustrated in Fig. 11.

As the flywheel advances to the position shown in Fig. 8 the pole shoe 164 overlaps both the first and second stator poles 144 and 146, while the second pole shoe 166 overlaps both the second and third stator poles 146 and 148. In this position the magnetomotive force of the trailing magnet 162 is equal to and of opposite direction to that of the magnet 160 so that the flux through the center leg 146 of the stator is reduced to zero. This point on the flux curve is designated A—B in Fig. 11, the primary current being shown in dotted lines in Fig. 11.

Continued rotation of the flywheel to the position shown in Fig. 9 brings the leading pole shoe 164 opposite the stator pole 144, while the second and third shoes 166 and 168 respectively overlie the second and third stator poles 146 and 148. In this position the flux through the center leg 146 of the stator, indicated by the arrows in Fig. 9, is the result of the magnetomotive force of magnet 160 plus the magnetomotive force of magnet 162, resulting in a flux having twice the amplitude but of opposite direction from the flux resulting from the Fig. 7 position of the flywheel. This flux is designated A+B in Fig. 11. The breaker points 68 and 70 are opened at the instant the flywheel reaches the position shown in Fig. 9, which is the position at which the primary current reaches its peak value, thereby connecting the condenser into the primary circuit, decreasing the primary current to zero and generating a high voltage in the secondary coil to produce a spark at the spark plug.

When the flywheel is advanced further to the position shown in Fig. 10, the second and third pole shoes 166 and 168 respectively overlie the first and second stator poles 144 and 146 and the second and third stator poles 146 and 148, thereby again reducing the flux through the coil core to zero, which is the second position designated A—B in the flux curve illustrated in Fig. 11.

Fig. 2 illustrates the retarded spark position of the flywheel in which the second pole shoe 166 overlies the stator pole 144, while the third pole shoe 168 overlies the second or coil leg 146 of the stator, thereby inducing a flux through the core in the direction of the arrows illustrated in Fig. 2 from the magnetomotive force of the magnet 162. This point on the flux curve is designated B in Fig. 11. It will be seen from Fig. 11 that the flux change in the coil from the Fig. 7 position of the flywheel to the Fig. 9 position, the latter being the advanced spark position of the magneto, is three times the magnitude of flux that is available from one of the magnets. Furthermore, the flux change for the retarded spark firing of the plug is of the same value so that the magneto is capable of producing two separate sparks of equal magnitude during each engine cycle. Thus, if the engine is operating under starting or low speed conditions, the setting of the cam 84 will maintain the breaker points closed until the Fig. 2 position of the magneto is reached at which time the maximum voltage will be available in the secondary coil to produce the spark. As soon as the engine attains a predetermined speed, the cam 84 is snapped around to its advanced spark position as previously described and the points will be opened when the magneto reaches the position shown in Fig. 9, at which time the maximum voltage is also available in the secondary coil to produce the spark.

The construction described herein insures that at both high speed and low speed engine operation the spark will be produced at those instances in the cycle of operation which are the most efficient for engine operation at such speed. This design, with two flux reversals of double magnitude, also requires less magnet and core material than is necessary in systems using only one flux reversal, since in the present system the amount of flux available from each magnet may be less than is required in the prior systems.

While we have illustrated and described a preferred embodiment of our invention, it is understood that this is capable of modification, and we therefore do not wish to be limited to the precise details set forth but desire to avail ourselves of such changes and alterations as fall within the purview of the following claims.

We claim:

1. A magneto for an internal combustion engine having a rotatable shaft and a flywheel rotatable with said shaft, comprising a stator core having first, second and third poles having their outer faces concentric with and equidistant from the axis of the flywheel, said pole faces being angularly spaced apart substantially equal distances with said second pole disposed between said first and third poles, primary and secondary coil windings on said second stator pole, a pair of angularly spaced magnets carried by the flywheel, a pole shoe connected to the leading end of the leading magnet, a second pole shoe disposed between and connected to the trailing end of the leading magnet and the leading end of the trailing magnet, and a third pole shoe connected to the trailing end of the trailing magnet, said pole shoes having concentric inner faces movable in close proximity to the said pole faces upon rotation of the flywheel, said pole shoes and said pole faces being so spaced and related that successively during each revolution of the flywheel: (a) said first and second pole shoes respectively overlie said second and third pole faces to generate a flux from the leading magnet in one direction through said second pole; (b) said first and second pole shoes respectively overlie said first and second pole faces and said second and third pole faces to reduce the flux through said second pole to zero; (c) said first, second and third pole shoes respectively overlie said first, second and third pole faces to generate a flux from both said magnets in the opposite direction through said second pole; (d) said second and third pole shoes respectively overlie said first and second pole faces and said second and third pole faces to again reduce the flux through said second pole to zero; and (e) said second and third pole shoes respectively overlie said first and second pole faces to generate a flux from the trailing magnet in said one direction through said second pole thereby to effect two separate and equal magnitude flux reversals through said second pole during each revolution of the flywheel.

2. A magneto for an internal combustion engine having a rotatable shaft, comprising a stator core having first, second and third poles having their outer faces concentric with and equidistant from the axis of the flywheel, primary and secondary coil windings on said second stator pole, a pair of angularly spaced apart circumferentially charged magnets rotatable with said shaft, pole shoes connected to said magnets and having concentric inner faces movable in close proximity to the outer faces of said poles upon rotation of the shaft, said pole shoes and said pole faces being so spaced and related that successively during each revolution of the shaft: (a) a magnetic flux is generated from one of said magnets in one direction through said second pole; (b) the magnetic flux through said second pole is reduced to zero; (c) a magnetic flux is generated from both said magnets in the opposite direction through said second pole; (d) the magnetic flux through said second pole is again reduced to zero; and (e) a magnetic flux is generated from the other of said magnets in said one direction through said second pole thereby to effect two separate and equal magnitude flux reversals through said second pole during each revolution of the shaft.

3. A magneto ignition system for an internal combustion engine having a rotatable shaft comprising a stator core having a plurality of poles having their outer faces concentric with and equidistant from the axis of the shaft, primary and secondary coil windings on one of said stator poles, a pair of angularly spaced magnets rotatable with said shaft, pole shoes connected to said magnets and having concentric inner faces movable in close proximity to the outer faces of said poles upon rotation of the shaft, said pole shoes and said pole faces being arranged so that successively during each revolution of the shaft: (a) a magnetic flux is generated in one direction through said second pole from one of said magnets; (b) the magnetic flux through said second pole is reduced to zero; (c) a magnetic flux is generated in the opposite direction through said second pole from both said magnets; (d) the magnetic flux through said second pole is again reduced to zero; and (e) a magnetic flux is generated in said one direction through said second pole from the other of said magnets thereby to effect two separate and equal flux reversals through said second pole during each revolution of the shaft, a breaker point mechanism including separable contacts in series with the coil windings, and means for opening said contacts in timed relation to the rotation of said shaft so that said contacts are opened when the pole shoes are in the position designated (c) above a predetermined engine speed, and are opened when said pole shoes are in the position designated (e) at engine speeds below said predetermined engine speed.

4. An ignition system according to claim 3 wherein said means for opening said contacts comprises a rotatable cam, means connecting said cam and said contacts, and a member driven with said shaft and connected to said cam to rotate said cam with said shaft and to effect opening of said contacts during each revolution of said cam, said member being movable responsive to centrifugal force to shift the engular position of said cam relative to said shaft in accordance with the engine speed.

5. In an ignition system for an internal combustion engine having a crankshaft and a part driven from the crankshaft at one-half the speed of the crankshaft, a pair of breaker points, a cam rotatable with said part and a cam follower engageable with the cam and operable to actuate the breaker points once during each revolution of said cam, a shift weight secured to said part for rotation therewith and movable relative thereto in response to centrifugal force, said weight engaging the cam to shift said cam angularly relative to said part in accordance with the speed of rotation of said engine, a control weight rotatable with said part and movable relative thereto in response to centrifugal force, said control weight being engageable with said shift weight to prevent movement of the latter in a direction to advance the cam relative to said part until a predetermined engine speed is attained, said control weight being movable by centrifugal force to disengage said shift weight to permit said shift weight to abruptly advance said cam at said predetermined engine speed, and spring means resisting movement of said weights by centrifugal force.

6. In an ignition system for an internal combustion engine having a crankshaft, a pair of breaker points, a cam rotatable with the crankshaft of the engine, a cam follower engageable with the cam and operable to actuate the breaker points during each revolution of said cam, a shift weight rotatable with said crankshaft and movable relative thereto in response to centrifugal force, said shift weight engaging the cam and being operable to shift said cam angularly relative to said crankshaft in accordance with the speed of rotation of said engine, a control weight rotatable with said crankshaft and movable relative thereto in response to centrifugal force, said control weight being engageable with said shift weight to prevent movement of the latter in a direction to advance the cam relative to said crankshaft until a predetermined engine speed is attained, and spring means resisting movement of said weights by centrifugal force.

7. An ignition system according to claim 6 wherein said shift weight and its spring means are arranged so that the centrifugal force acting on said shift weight at speeds below said predetermined engine speed is sufficient to cause said shift weight to advance said cam except for the said engagement of said control weight with said shift weight, said control weight being adapted to disengage said shift weight at said predetermined engine speed, whereupon said shift weight abruptly advances said cam relative to said crankshaft.

8. An ignition system for an internal combustion engine having a crankshaft, a pair of breaker points, a cam rotatable with the crankshaft, a cam follower engageable with the cam and operable to actuate the breaker points once during each revolution of said cam, means operable responsive to the speed of rotation of said crankshaft and engaging said cam to shift said cam angularly relative to said crankshaft in accordance with the speed of rotation of said crankshaft, a control weight rotatable with said crankshaft and movable relative thereto in response to centrifugal force, said control weight engaging the cam shifting means to prevent movement of the latter in a direction to advance the cam relative to said crankshaft until a predetermined engine speed is attained.

References Cited in the file of this patent

UNITED STATES PATENTS 2,806,156    Phelon _____ Sept. 10, 1957

FOREIGN PATENTS 391,379    Great Britain _____ Apr. 27, 1933